United States Patent Office 3,094,381
Patented June 18, 1963

3,094,381
PRODUCTION OF AMMONIUM FLUORIDE FROM GASEOUS COMPOUNDS OF SILICON AND FLUORINE
Albert H. Cooper, Ridgewood, N.J., assignor to United Technical Industries, Inc., Murray, Utah, a corporation of Delaware
No Drawing. Filed Mar. 21, 1958, Ser. No. 722,847
6 Claims. (Cl. 23—88)

This invention relates to the production of synthetic cryolite and synthetic silica.

The waste gases evolved in the production of phosphates and phosphoric acid from naturally occurring phosphatic material containing fluorine provide an inexpensive source of readily available fluorine from chemical plants which produce phosphates, such as superphosphate fertilizers, and phosphoric acid. Fluorosilicic acid or fluorosilicates similarly provide utilizable sources of fluorine. The preparation of high purity synthetic cryolite from these materials constitutes a radical departure from known methods of manufacturing synthetic cryolite. Heretofore cryolite synthesis required the use of fluorspar, a raw material in short supply, and involved the initial expensive step of making hydrofluoric acid. This expense and the low quality of prior art synthetic cryolite discouraged the utilization of synthetic cryolite for dissolving alumina during the electrolytic process for the production of aluminum.

The gases which provide the source material for this process of producing fluoride or bifluoride useful in the synthesis of cryolite are evolved during the processes for producing phosphates and phosphoric acid from naturally occurring phosphate substances containing fluorine. Examples of such fluorine liberating processes known in the art are the production of superphosphate fertilizers or phosphoric acid, in which the phosphatic material containing fluorine is reacted with sulfuric acid, thus liberating fluorine-containing gases. Treatment of phosphate rock containing fluorine as calcium fluoride and silica with sulfuric acid to produce a superphosphate is accompanied by the liberation of a gas containing fluoride largely in the form of silicon tetrafluoride with some hydrogen fluoride. Commonly, depending upon the proportion of ventilating air used by a particular plant in sweeping the phosphatic reaction mass, the silicon tetrafluoride content of the waste gas will vary from 0.25% to 4.0%.

Treatment of fluoride bearing calcium phosphate rock containing concomitantly associated calcium fluoride with sufficient sulfuric acid to liberate phosphoric acid causes liberation of silicon tetrafluoride gas and a phosphoric acid solution containing fluorosilicic acid which upon concentration effects liberation of additional silicon tetrafluoride. Alternatively, the dilute phosphoric acid may be freed of fluorine by the addition of sodium chloride whereby sodium fluorosilicate is precipitated. The sodium fluorosilicate may then be utilized in the production of pure fluorides and cryolite.

Phosphate rock, containing calcium fluoride, is sometimes prepared as defluorinated calcium phosphate by calcining with additional silica whereby the liberated gas contains hydrogen fluoride with some silicon tetrafluoride. The thus liberated fluorine-containing gas is processed in accordance with this invention.

Fluorine-bearing phosphate rock, upon mixing with silica and coke and heating in an electric furnace produces primarily calcium silicate and free phosphorus. A gas containing carbon monoxide and hydrogen fluoride is liberated from the charge. The fluorine is recoverable from this gas as herein described.

Conveniently, when the fluorine containing gases as raw material contain hydrogen fluoride and/or silicon tetrafluoride along with air, water vapor and phosphate rock dust, it is desirable, albeit not essential, to separate the dust from the gas. Separation of the dust can be effected by centrifugal action, filtration through a filter cloth or mat, electrostatic precipitation, or by scrubbing the effluent gas with water. In the latter event, the water will initially dissolve fluorides, but upon recycling this scrubbing water it soon becomes saturated with soluble factors and thence continues to remove only solid particles which are physically entrained by the water. Excessive build up of solids is prevented by filtering the water or settling and decanting the aqueous from solid material.

The fluorine bearing gas, preferably freed from solid dust particles, is passed through an absorption tower. Absorption is suitably effected by selected liquid or solid absorbents.

If liquid absorbents are used, the absorbing agent may be water or aqueous solutions containing ammonium hydroxide, ammonium bicarbonate, ammonium carbonate, sodium hydroxide, sodium bicarbonate, sodium carbonate, potassium hydroxide, potassium bicarbonate, potassium carbonate, sodium chloride, or sodium fluoride. Silicon tetrafluoride forms fluorosilicic acid and precipitates silica in the presence of water. Accordingly, in the presence of the above bases, the corresponding fluorosilicate is formed and silica precipitates.

The liquid absorbing agent may be introduced into the absorption tower in any manner. For example, the liquid solvent may be sprayed into contact with the gases passing through the absorption tower, or the solvent and gases may be passed countercurrently through inert packing in the tower so as to give ample surface contact between the gas and liquid streams to facilitate absorption.

For some industrial installations, especially because of size and transportation factors, it is desirable to use a solid absorption agent rather than a liquid or aqueous absorbent. The fluorine bearing gas is passed through a mass of particulate absorbent solid. The solid may be in the form of a fixed bed as powder or lumps, or in the form of a fluidized bed through which the fluorine bearing gas is blown to keep the fluidized absorbent solids in a floating state but below such a velocity which would blow the suspended particles out of the absorption unit. Solids suitable for absorption of fluorine from gas include sodium bicarbonate, sodium carbonate, potassium bicarbonate, potassium carbonate, ammonium bicarbonate, ammonium carbonate, sodium chloride, sodium fluoried and aluminum oxide. In the case of solids absorption there is simultaneous chemical reaction with the solids to form fluorides and fluorosilicates. Significant advantages obtained in using dry solids for absorption of fluorine from gases are the greatly reduced corrosion of equipment, the simplicity of equipment, the ease of storage or shipment of the solids to other plants for further processing if desired.

Commonly the normal variation of concentration of fluorine in waste gases is from 0.25 percent to 4 percent. When water is used to absorb the waste gases by forming fluorosilicic acid, the optimum concentration of fluorosilicic acid in the absorption liquor is 20 percent with a concentration of 0.25 percent fluorine in the waste gas used as feed stock and 30 percent with a concentration of 4 percent fluorine in the feed stock. To achieve 20 percent concentration of fluorosilicic acid with 0.25 percent concentration of fluorine in waste gas feed stock, 20 gallons of water are used per 1000 cubic feet of gas. To achieve 30 percent concentration of fluorosilicic acid with a 4 percent concentration of fluorine in water gases, 12 gallons of water are used per 1000 cubic feet of gases When the waste gases are absorbed in solids, optimum concentration is 1 to 2 pounds of solid per pound of fluorine in the waste gas. This requires 1 to 2 pounds of solid absorbent per 4000 cubic feet of gas containing a fluorine content of 0.25 percent, and 1 to 2 pounds of solid absorbent per 300 cubic feet of gas when fluorine concentration in the gas is 4 percent. With aqueous ammonia absorbent, the scrubbing solution preferably has a pH of from 6 to 8. To avoid excess fluoride precipitation and facilitate further processing, a fluoride concentration of 30 to 40 grams per liter is established.

With absorption of the fluorine from gases by utilization of liquid absorbents or solid absorbents, as described above, greater or lesser proportions of absorbent to waste gases are employable with varying efficiency.

Aqueous absorbent of fluorine from waste gases containing silicon tetrafluoride is accompanied by precipitation of a portion of the silica content as free silica which is decantable from the aqueous absorbent. The silica is removed by means well known in the art such as sedimentation or filtration. If the waste gases before absorption have been freed of rock dust and other solid particles, the silica recovered at this stage is exceptionally pure and of commercial value.

Some of the silica from the silicon tetrafluoride remains in the aqueous absorbent in the form of fluorosilicic acid or fluorosilicate and is converted to fluoride salt in the next step.

The fluorine containing aqueous material as prepared above or prepared from the addition of water to the fluorine bearing solid absorbent is reacted with additional ammonium hydroxide, ammonium carbonate, ammonium bicarbonate, sodium hydroxide, sodium carbonate, sodium bicarbonate, potassium hydroxide, potassium bicarbonate, or potassium carbonate to produce the corresponding fluoride salt with precipitation and elimination of the silica from fluorosilicic acid or fluorosilicate initially present.

For the production of synthetic cryolite it is desirable to select as fluoride forming agents only ammonia, ammonium hydroxide or sodium hydroxide. Of course, to make fluoride compositions that are not limited to subsequent production of synthetic cryolite, the remaining fluoride-forming agents may be used.

The fluorine containing aqueous material, prepared as described above, is reacted with alkali to produce the bifluoride and then if desired the normal fluoride. With ammonia, the bifluoride is produced at pH 6 to 7 and the ammonium fluoride at pH 7 to 9. When water is initially used to absorb the waste gases, thus forming fluorosilicic acid, ⅓ pound of anhydrous ammonia per pound of fluorosilicic acid is required to produce a pH of 6 to 7 and ¾ pound of anhydrous ammonia per pound of fluorosilicic acid is required to produce a pH of 7 to 9. To improve the filtration characteristics and enable rapid separation of the dissolved fluorides from the precipitated silica, the alkali is adjusted to give a pH of from 8.3 to 8.6 in the resulting mixture. This is essential in the commercial production of a synthetic cryolite of high grade.

If sodium fluoride is used as an absorbing agent for the waste gases, the resulting proportion of fluorine is so high that only the bifluoride may be produced.

During the formation of bifluoride or fluoride from the fluorosilicate or fluorosilicic acid as described above, silica of high purity is precipitated and is separated suitably by sedimentation, decantation, or filtration. If strong alkali such as a concentrated sodium hydroxide is used in fluoride formation, the silica is formed into sodium silicate and the sodium silicate may be converted if desired into silica gel as known in the art.

For the preparation of a pure synthetic cryolite it is especially desirable that the aqueous absorbent solution of ammonium fluoride or ammonium hydroxide, fluoride and fluorosilicic acid or fluorosilicate, in the form of ammonium fluorosilicate, at a pH of from 6 to 8 should be continuously reacted with ammonia to produce a mixture having a pH of from 8.3 to 8.6 without additional excess of reagents whereby the maximum proportion of silica is effectively precipitated and the thus-produced fluoride solution is freed of silica and is eminently suitable for high grade synthetic cryolite production.

After separation, as by filtration, of the silica from the thus-produced fluoride solution, the fluoride solution preferably at a concentration of 1.5 percent fluorine content is reacted with alumina and soda to produce cryolite. Preferably the alumina and soda are in the form of an aqueous solution of sodium aluminate containing about 30% excess sodium hydroxide over the stoichiometric amount required to react with aluminum hydrate to form sodium aluminate. The sodium aluminate solution is reacted with ammonium fluoride solution, as prepared above, by mixing the solutions at a temperature of from 70 to 100° C. to cause the reaction to take place rapidly and completely to expel ammonia and to prevent the formation of ammonium aluminum fluoride in the final product. The solutions may be previously heated, or heated during or after mixing. The liberated ammonia is removed from the reaction zone and is recycled to the fluoride salt formation and/or fluoride absorption stages.

After the precipitation of sodium aluminum fluoride, or cryolite, and removal of the ammonia, the cryolite is separated from the solution as by sedimentation or filtration, and washed with water to remove soluble salts. The precipitated cryolite contains both free water and water of hydration. The wet cryolite is dried at a temperature of about 110° C. to remove free water and then the cryolite is freed of water of crystallization at a temperature of from 500 to 700° C. It is essential that the cryolite be kept at a temperature no higher than 110° C. until the free water is removed, otherwise an excessive rate of drying or excessive temperature will result in thermal decomposition of the cryolite with consequent degradation of quality and loss of some of the fluorine content.

In lieu of synthetic cryolite production, the fluoride solution as obtained above, is reacted with alumina or aluminum sulfate to produce aluminum fluoride. The addition of sulfuric acid to the fluoride solution produces hydrofluoric acid of high purity, which can be concentrated by distillation, or absorption in sodium fluoride and subsequent liberation therefrom.

The following examples are illustrative only and are not intended as restrictive of the invention.

*Example 1*

The fluorine-bearing waste gas, from a phosphate rock processing superphosphate manufacturing operation, containing air, hydrogen fluoride and silicon tetrafluoride, with the fluoride principally in the form of silicon tetrafluoride at a concentration of about 2 percent was passed through a water scrubber wherein the water was recycled until the fluorosilicic acid content of the water solution was about 25 percent. About 15 gallons of fresh water are introduced for each 1000 cubic feet of waste gas processed and about 15 gallons of absorption liquor are removed on a continuous basis to provide an aqueous solution containing about 25 percent fluorosilicic acid.

*Example 2*

Fluorine-bearing waste gas containing about 0.25 percent of silicon tetrafluoride is scrubbed counter-currently with a shower of aqueous ammonia. Liquid ammonia is introduced into the absorption liquor, although gaseous ammonia may be introduced if desired along with the fluorine bearing waste gas, at such a rate as to maintain the absorption solution containing ammonium hydroxide and silicofluoride at a pH of 6 to 8, and preferably 7, whereby an absorption liquor containing ammonium fluorosilicate is effected. The solution is recycled with addition of ammonia until a satisfactory fluorosilicate concentration, such as about 30 to 40 grams of fluorine per liter of liquor is obtained.

*Example 3*

Otherwise like Example 2, using sodium hydroxide in place of ammonium hydroxide provided a solution of sodium fluorosilicate.

*Example 4*

Solid sodium bicarbonate is deposited on screens in an absorption column whereby fluorine-containing waste gases are passed sequentially through a series of screens and supported bed of sodium bicarbonate to absorb the fluorine therefrom. About 2 pounds of solid sodium bicarbonate is provided for each 400 cubic feet of gas containing a fluorine content of 0.25 percent. The resulting cake is high in fluorine content and is amenable to practical utilization for its fluorine value and in cryolite synthesis.

*Example 5*

The fluorosilicic acid solution as obtained in Example 1 is mixed with sufficient aqueous ammonia of 29 percent concentration to form ammonium fluoride and precipitate silica at a pH of 8.3 to 8.6. Mixing of small batches is accomplished by the addition of either reagent to the other. Preferably, especially with large batches, the reagents are continuously flowed and proportioned to avoid excess of either reagent and to rapidly achieve a pH of about 8.3 to 8.6. The solutions upon mixing are at a temperature of 60° C. The precipitated silica is separated by filtration and the filtrate provides silica-free ammonium fluoride suitable for use as such or in the preparation of cryolite.

*Example 6*

In accordance with Example 5, additional ammonia is mixed with the ammonium fluorosilicate solution of Example 2 to give a pH of 8.3 to 8.6 in the hot mixture at 60° C. whereupon the mixture is filtered to remove silica and a silica free ammonium fluoride solution is obtained.

*Example 7*

To a solution of sodium fluorosilicate, prepared as in Example 3, containing 5.8 percent of sodium fluorosilicate at a temperature of from 50 to 70° C., there was added concentrated, 27 percent, ammonium hydroxide solution to the slurry until the resulting mixture had a pH of between 8.3 and 8.6 inclusive. Silica is thereby precipitated and sodium fluoride and ammonium fluoride remain in solution. Upon filtration, the silica is recovered and dried to produce a high purity silica. The filtrate is mixed with a sodium aluminate solution containing about 30 percent excess sodium hydroxide over the stoichiometric proportion necessary to react with the aluminum hydrate from which the sodium aluminate solution is formed. The reagents are proportioned so that a pH of about 9 is immediately obtained upon mixing the ammonium and sodium fluorides with the sodium aluminate. Ammonia is liberated and heating to the boiling point facilitates separation of the ammonia and completion of the precipitation of the resulting cryolite. The cryolite is filtered, washed with water and dried first at a moderate temperature of about 100° C. to remove all free and uncombined water. After this free and uncombined water is removed, additional heating to a temperature between 300° C. and preferably 500° C. to 700° C. produces an anhydrous synthetic cryolite of exceptional purity.

*Example 8*

Otherwise like Example 7, using the fluorosilicate solution obtained in Example 1 in place of that from Example 3 produced the same results.

*Example 9*

Otherwise like Example 7, using the ammonium fluorosilicate solution obtained in Example 2 in place of that from Example 3 produced the same result.

*Example 10*

The procedures of each of Examples 7, 8 and 9 were repeated, but the aqueous sodium aluminate solution was gradually added so that a pH of 9 was immediately established in the mixed portion and the mixture was proportioned and maintained until just short of complete reaction as indicated by minimum conductivity bridge measurement of the mixed solutions, then the resulting precipitate of pure cryolite was separated and dried to remove free and uncombined water and also water of crystallization. Very pure anhydrous synthetic cryolite was thereby obtained.

This application is a continuation-in-part of application Serial No. 373,446, filed July 27, 1953, now abandoned.

What I claim is:

1. A process for the production of fluorine-containing compounds which comprises adding an aqueous fluosilicic acid-containing solution to sufficient aqueous ammonia to maintain a pH above 7 in the resulting reaction mixture, and separating the resulting silica which precipitates from the resulting ammonium fluoride solution.

2. The process of claim 1 wherein said pH is in the range of from above 7 to 9.

3. The process of claim 1 wherein said ammonium chloride solution is mixed with a solution of sodium aluminate while maintaining the temperature of the mixture during mixing between 70° C. and 100° C. to precipitate synthetic cryolite and recovering said precipitated synthetic cryolite.

4. A process for the production of ammonium fluoride from mixtures of phosphate-containing compounds and compounds of silicon and fluorine resulting from phosphate rock acidulation processes which comprises separating said compounds of silicon and fluorine in substantially pure gaseous form from said mixtures, dissolving said separated substantially pure compounds of silicon and fluorine in an aqueous medium to form an acidic solution thereof, admitting said acid solution and an aqueous solution of ammonia into a reaction zone, regulating the relative rates at which said acid solution and said aqueous solution of ammonia are admitted to achieve one predetermined pH above 7 to form an aqueous solution of ammonium fluoride and precipitated silica, separating said precipitated silica from said aqueous solution of ammonium fluoride, and recovering said aqueous solution of ammonium fluoride.

5. The process of claim 4 wherein said pH in the range of from above 7 to 9.

6. The process of claim 4 wherein said ammonium fluoride solution is mixed with a solution of sodium aluminate while maintaining the temperature of the mixture during mixing between 70° C. and 100° C. to precipitate synthetic cryolite and recovering said precipitated synthetic cryolite.

References Cited in the file of this patent

UNITED STATES PATENTS

| | | |
|---|---|---|
| 1,235,552 | Chappell | Aug. 7, 1917 |
| 1,617,708 | Gehauf et al. | Feb. 15, 1927 |
| 1,851,475 | Zimmerman | Mar. 29, 1932 |
| 1,869,019 | McIntyre | July 26, 1932 |
| 1,927,108 | Zimmerman | Sept. 19, 1933 |
| 2,075,370 | Strathmeyer | Mar. 30, 1937 |
| 2,426,558 | Long et al. | Aug. 26, 1947 |
| 2,780,522 | Gloss et al. | Feb. 5, 1957 |
| 2,780,524 | Gloss et al. | Feb. 5, 1957 |
| 2,785,953 | Fitch | Mar. 19, 1957 |
| 2,816,818 | Gross | Dec. 17, 1957 |

UNITED STATES PATENT OFFICE
CERTIFICATE OF CORRECTION

Patent No. 3,094,381            June 18, 1963

Albert H. Cooper

It is hereby certified that error appears in the above numbered patent requiring correction and that the said Letters Patent should read as corrected below.

Column 6, lines 24 and 25, for "chloride" read -- fluoride --.

Signed and sealed this 11th day of February 1964.

(SEAL)
Attest:

ERNEST W. SWIDER
Attesting Officer

EDWIN L. REYNOLDS

Acting Commissioner of Patents